(12) United States Patent
Kobayashi et al.

(10) Patent No.: US 9,982,710 B2
(45) Date of Patent: May 29, 2018

(54) CRANKSHAFT BEARING STRUCTURE OF INTERNAL COMBUSTION ENGINE

(71) Applicant: Nissan Motor Co., Ltd., Yokohama-shi, Kanagawa (JP)

(72) Inventors: Makoto Kobayashi, Kanagawa (JP); Shinya Oohira, Kanagawa (JP); Hiroaki Mochida, Kanagawa (JP); Kensuke Ikehara, Kanagawa (JP); Wataru Arai, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days. days.

(21) Appl. No.: 15/504,692

(22) PCT Filed: Aug. 21, 2014

(86) PCT No.: PCT/JP2014/071837
§ 371 (c)(1),
(2) Date: Feb. 17, 2017

(87) PCT Pub. No.: WO2016/027337
PCT Pub. Date: Feb. 25, 2016

(65) Prior Publication Data
US 2017/0268563 A1 Sep. 21, 2017

(51) Int. Cl.
*F16C 9/03* (2006.01)
*F16C 17/02* (2006.01)
(52) U.S. Cl.
CPC .............. *F16C 9/03* (2013.01); *F16C 17/022* (2013.01); *F16C 2204/20* (2013.01)

(58) Field of Classification Search
CPC ...... F16C 9/03; F16C 17/022; F16C 2204/20; F16C 2202/22
See application file for complete search history.

(56) References Cited

U.S. PATENT DOCUMENTS

| 5,609,422 A | * | 3/1997 | Mueller | F02F 7/0053 384/278 |
| 2006/0046087 A1 | * | 3/2006 | Oda | B22D 19/14 428/578 |

FOREIGN PATENT DOCUMENTS

| DE | 10 2008 047 186 A1 | 3/2010 |
| JP | 6-330932 A | 11/1994 |
| JP | 7-27126 A | 1/1995 |
| JP | 7-103071 A | 4/1995 |
| JP | 8-284748 A | 10/1996 |
| JP | 2004-108418 A | 4/2004 |
| JP | 2007-162637 A | 6/2007 |

* cited by examiner

*Primary Examiner* — Thomas R Hannon
(74) *Attorney, Agent, or Firm* — Global IP Counselors, LLP

(57) ABSTRACT

A crankshaft of an in-line, four-cylinder internal combustion engine has five journal portions. The journal portions are each supported by a main bearing unit. Each of the main bearing units includes a cylinder block side bearing part and a bearing cap. The No. 1, No. 2, No. 4 and No. 5 main bearing units employ an iron-based bearing cap, and the No. 3 main bearing unit at the center employs a bearing cap made of an aluminum alloy having a relatively high thermal expansion coefficient. At high temperatures, the bearing clearance of the No. 3 main bearing unit is configured to expand so as to reduce bearing load.

9 Claims, 5 Drawing Sheets

COLD TEMPERATURE (20°C)

NORMAL TEMPERATURE (80°C)

CRANKSHAFT BEARING STRUCTURE OF INTERNAL COMBUSTION ENGINE

CROSS-REFERENCE TO RELATED APPLICATIONS

This application is a U.S. National stage application of International Application No. PCT/JP2014/071837, filed on Aug. 21, 2014.

BACKGROUND

Field of the Invention

The present invention relates to an improvement in a crankshaft bearing structure of an internal combustion engine.

Background Information

A crankshaft of an internal combustion engine is supported by plurality of main bearing units that are configured by a semicircular recess in the cylinder block and a bearing cap that is attached to the lower surface of the cylinder block. In general, the main bearing units are respectively disposed at both ends of the crankshaft and in positions between cylinders.

For example, in an in-line four-cylinder internal combustion engine, the crankshaft is generally supported by five main bearing units, No. 1 to No. 5; a pair of halved metal bearings is mounted to each main bearing unit, and the crankshaft is rotatably supported via the metal bearing.

In a crankshaft bearing structure having a plurality of such main bearing units, the bearing clearances in the main bearing units are set to be equal to each other.

However, in a situation where the crankshaft is being rotated at an extremely high speed, the rotating crankshaft is warped into an arcuate shape by an inertia load. Consequently, the bearing load in the No. 3 main bearing unit in the center becomes larger compared to the other main bearing units. In particular, in an in-line four-cylinder internal combustion engine, the piston of the No. 2 cylinder and the piston of the No. 3 cylinder move in phase, but when the pistons of two adjacent cylinders move in phase in this manner, the main journal between these two cylinders is displaced the most to the outer perimeter side; therefore, the bearing load in the No. 3 main bearing unit in the center becomes even greater. Therefore, there is a concern that bearing durability is threatened when, for example, the engine temperature is high and the engine is rotating at high speed.

When trying to avoid warping of the crankshaft described above, the number and the weight of the counterweights that are applied to the crankshaft is increased, which leads to an increase in the weight of the crankshaft.

Japanese Laid-Open Patent Application No. 2007-162637 (Patent Document 1) discloses increasing the rigidity of specific main bearing units such that the load distribution of each bearing part becomes equal, giving consideration to the fact that a large inertia load is input to specific main bearing units, in an in-line four-cylinder internal combustion engine employing a multi-link piston crank mechanism.

However, the Patent Document 1 does not disclose varying the bearing clearance in each main bearing unit.

SUMMARY

The present invention is a crankshaft bearing structure for a multi-cylinder internal combustion engine having two cylinders adjacent to each other whereby each piston moves in phase, and a main bearing unit is provided at each of two ends of the crankshaft, as well as to an inter-cylinder position. The bearing clearance of the main bearing unit is positioned between the two cylinders is greater than the bearing clearance of the other main bearing units at a time of high engine temperature.

According to one preferred aspect, the thermal expansion coefficient of a bearing cap that forms a part of the main bearing unit between the two cylinders is greater than the thermal expansion coefficient of the bearing caps in the other main bearing units, and the bearing clearance expands as the temperature of the engine rises.

In this manner, the bearing clearance of a specific main bearing unit sandwiched between two cylinders whereby the pistons move in phase is greater than the bearing clearance of the other main bearing units at a time of high engine temperature. The bearing load in the specific main bearing unit is reduced when the crankshaft is rotated while being warped into an arcuate shape. Therefore, the difference with the bearing loads in the other main bearing units is reduced. As a result, the bearing loads in a plurality of main bearing units become uniform.

DETAILED DESCRIPTION OF THE EMBODIMENTS

One embodiment of this invention will be described in detail below based on the drawings.

Figure 1:
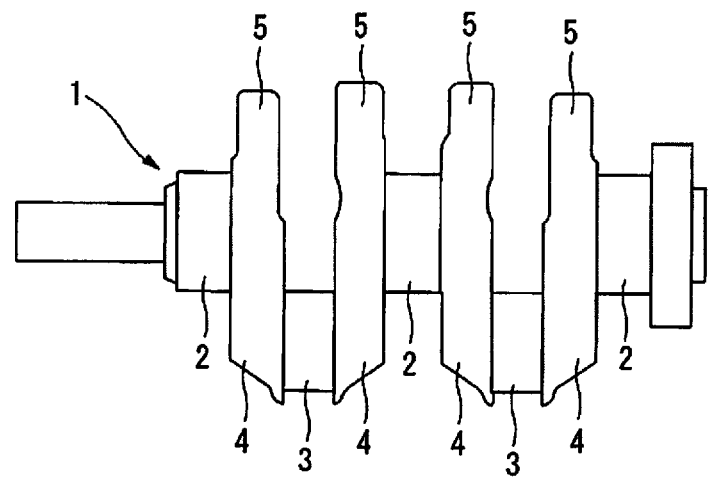
FIG. 1 is a side view illustrating the crankshaft of a first embodiment that is applied to an in-line, two-cylinder internal combustion engine.

FIGS. 1 to 4 illustrate the first embodiment in which the present invention is applied to an in-line, two-cylinder internal combustion engine. In this two-cylinder internal combustion engine, each piston (not shown) moves in phase in the No. 1 cylinder and the No. 2 cylinder, which are adjacent to each other. FIG. 1 illustrates a crankshaft 1 comprising journal portions 2 in a total of three locations, the front and rear end portions, as well as an intermediate portion, and also comprising two crank pins 3, in which the journal portion 2 and the crank pin 3 are each coupled via a crank web 4. In addition, each crank web 4 is provided with a crank pin 3 and a counterweight 5 on the 180° opposite side.

Figure 2:
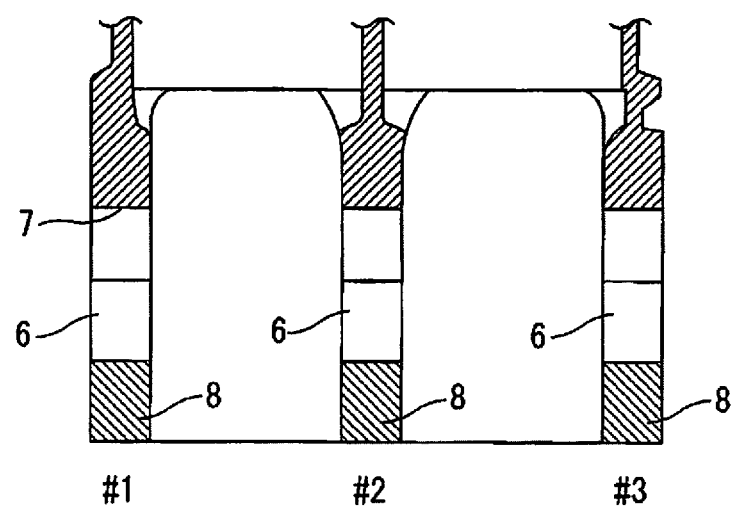
FIG. 2 is a cross-sectional view illustrating the main bearing units of the first embodiment.

FIG. 2 illustrates the three main bearing units 6, No. 1 to No. 3, which respectively support the journal portions 2 of the crankshaft 1 described above. The main bearing units 6 each includes a cylinder block side bearing unit 7 that is formed as a semicircular recess, and a semicircular bearing cap 8 that is attached facing the cylinder block side bearing part 7, and a metal bearing, which is not shown, is mounted to the inner perimeters thereof.

Here, the No. 1 main bearing unit 6 that supports the front end of the crankshaft 1 and the No. 3 main bearing unit 6 that supports the rear end, both have the same bearing clearance. In contrast, the bearing clearance of the No. 2 main bearing unit 6 that supports the central portion of the crankshaft 1 is set larger than the No. 1 main bearing unit 6 and the No. 3 main bearing unit 6. For example, in both the cylinder block side bearing part 7 that forms a part of the upper half of the No. 2 main bearing unit 6 and the bearing cap 8 that forms a part of the lower half, the diameter of the bearing surface is slightly larger.

Figure 3:
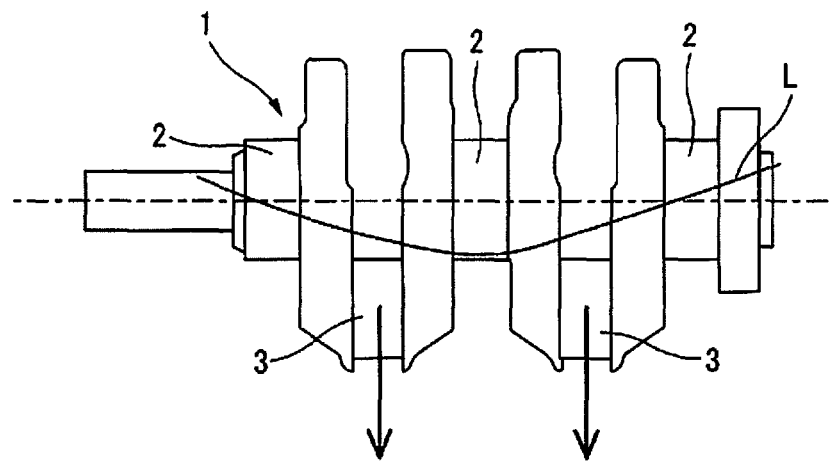
FIG. 3 is an explanatory view illustrating a modified form of the crankshaft.
Figure 4:
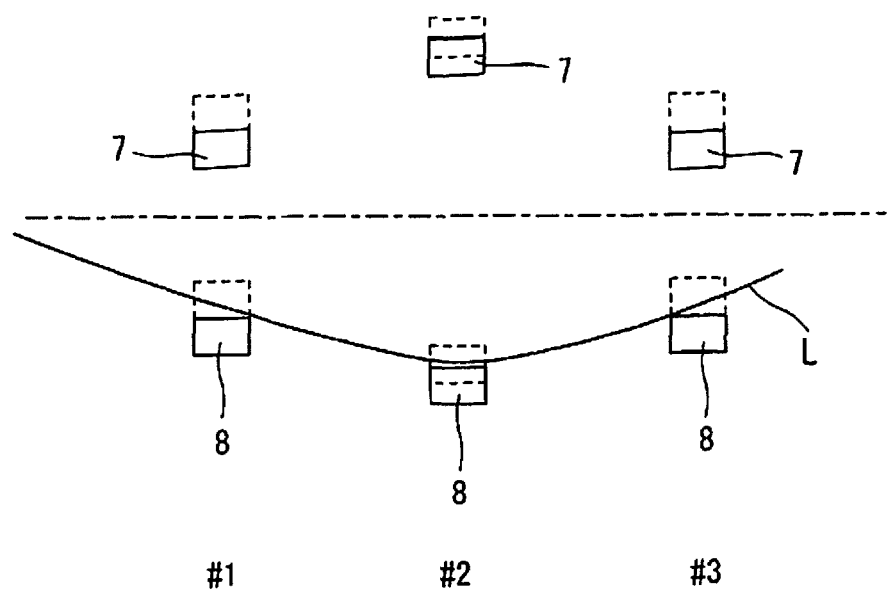
FIG. 4 is an explanatory diagram illustrating the displacements of the main bearing units accompanying a deformation of the crankshaft.

In the internal combustion engine described above comprising two cylinders whereby the pistons move in phase, the crankshaft 1 is rotated while being warped into an arcuate shape by the inertia load of the pistons, etc., as illustrated by the solid line L in FIG. 3. FIG. 3 illustrates the load and the deformation when the two pistons reach the bottom dead center. In this manner, for example at the bottom dead center of the piston, the three main bearing units 6 are displaced so as to sink downward from the initial position shown by the broken line to support each of the journal portions 2 with respect to the crankshaft 1 that moves while being warped into an arcuate shape, as illustrated in FIG. 4. Then, with the main bearing units 6 being displaced downward in this manner, a bearing load is generated in each of the main bearing units 6. Here, as a result of the crankshaft 1 being warped into an arcuate shape, the displacement of the No. 2 journal portion 2 in the center becomes larger compared to the anterior and posterior No. 1 and No. 3 journal portions 2; however, since the bearing clearance of the No. 2 main bearing unit 6 in the center is set larger in advance compared to the bearing clearances of the No. 1 and No. 3 main bearing units 6, the displacement of the No. 2 main bearing unit 6 is reduced, and the generated bearing load is reduced.

It is preferable to set the difference in the bearing clearance between the No. 2 main bearing unit 6 and the No. 1 and No. 3 main bearing units 6 so that the bearing loads of the three main bearing units 6 will be substantially equal when the temperature of the internal combustion engine (more specifically, the temperature around the main bearing units 6) is higher than the normal temperature after warm-up (for example 80° C.) and when the engine is in the high-speed region.

Figure 5:
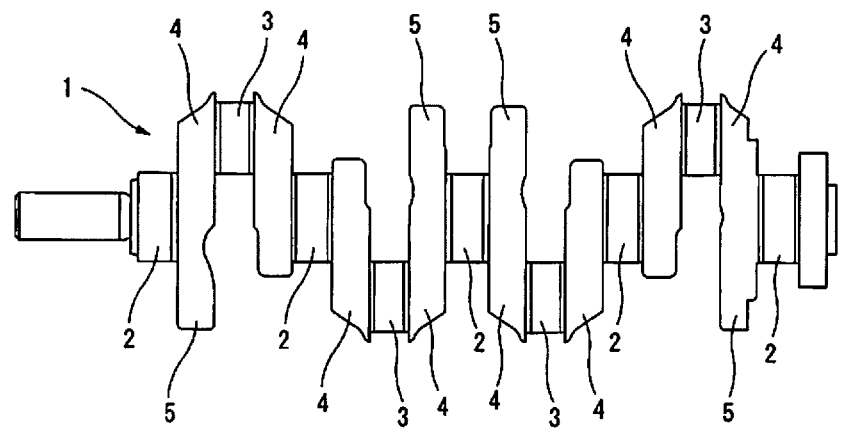
FIG. 5 is a side view illustrating the crankshaft of a second embodiment applied to an in-line, four-cylinder internal combustion engine.

Next, FIGS. 5 to 8 illustrate a second embodiment in which the present invention is applied to an in-line, four-cylinder internal combustion engine. In this four-cylinder internal combustion engine, each piston (not shown) moves in phase in the No. 2 cylinder and the No. 3 cylinder, which are adjacent to each other. FIG. 5 illustrates a crankshaft 1 comprising journal portions 2 in a total of five locations, the front and rear end portions and between each of the cylinders, and also comprising four crank pins 3, in which the journal portions 2 and the crank pins 3 are each coupled via a crank web 4. In addition, some of the crank webs 4 are provided with a crank pin 3 and a counterweight 5 on the 180° opposite side. Specifically, a counterweight 5 is provided at a total of four locations, the pair of crank webs 4 at the front and rear ends, and the pair of crank webs 4 that are positioned at both sides of the No. 3 journal portion 2 in the center.

Figure 6:
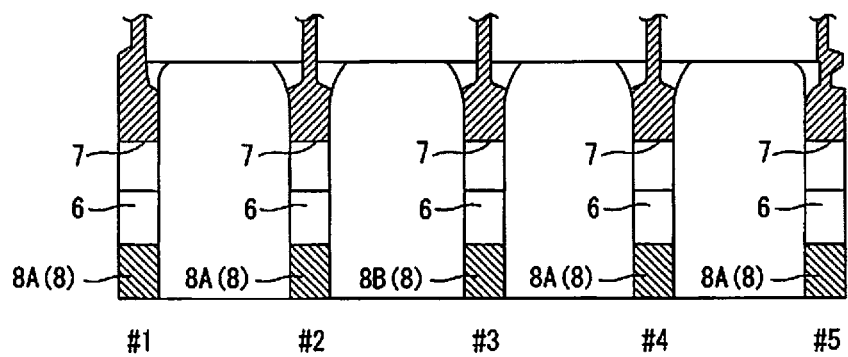
FIG. 6 is a cross-sectional view illustrating the main bearing units of the second embodiment.

FIG. 6 illustrates the five main bearing units 6, No. 1 to No. 5, which respectively support the journal portions 2 of the crankshaft 1 described above. The main bearing units 6 includes a cylinder block side bearing part 7 that is formed as a semicircular recess, and a semicircular bearing cap 8 that is attached facing the cylinder block side bearing part 7, and a bearing metal, which is not shown, is mounted to the inner perimeters thereof, as in the first embodiment described above.

Here, the main bearing units 6 in a total of four locations, the No. 1 main bearing unit 6 that supports the front end of the crankshaft 1, the No. 2 main bearing unit 6 between the No. 1 and No. 2 cylinders, the No. 4 main bearing unit 6 between the No. 3 and the No. 4 cylinders, and the No. 5 main bearing unit 6 that supports the rear end of the crankshaft 1, basically have the same configurations, and a bearing cap 8A that is primarily composed of iron is used as the bearing cap 8. For example, iron-based bearing caps are used, such as a bearing cap that is entirely cast in iron, and an insert casting type bearing cap in which an arched member made from cast iron is subjected to insert casting with an aluminum alloy. In the No. 3 main bearing unit 6 that supports the central portion of the crankshaft 1, a bearing cap 8B made of a metal material having a relatively higher thermal expansion coefficient than the iron-based bearing caps 8A, for example, a bearing cap 8B that is entirely made of aluminum alloy. By the materials of the bearing caps 8 being different, when the engine temperature (more specifically, the temperature around the main bearing units 6) is increased, the aluminum alloy bearing cap 8B is thermally expanded more in the radial direction than the iron-based bearing caps 8A. Therefore, when the engine temperature is high, the bearing clearance of the No. 3 main bearing unit 6 (in particular the bearing clearance in the lower half) is expanded more compared to the other main bearing units 6.

Figure 7:
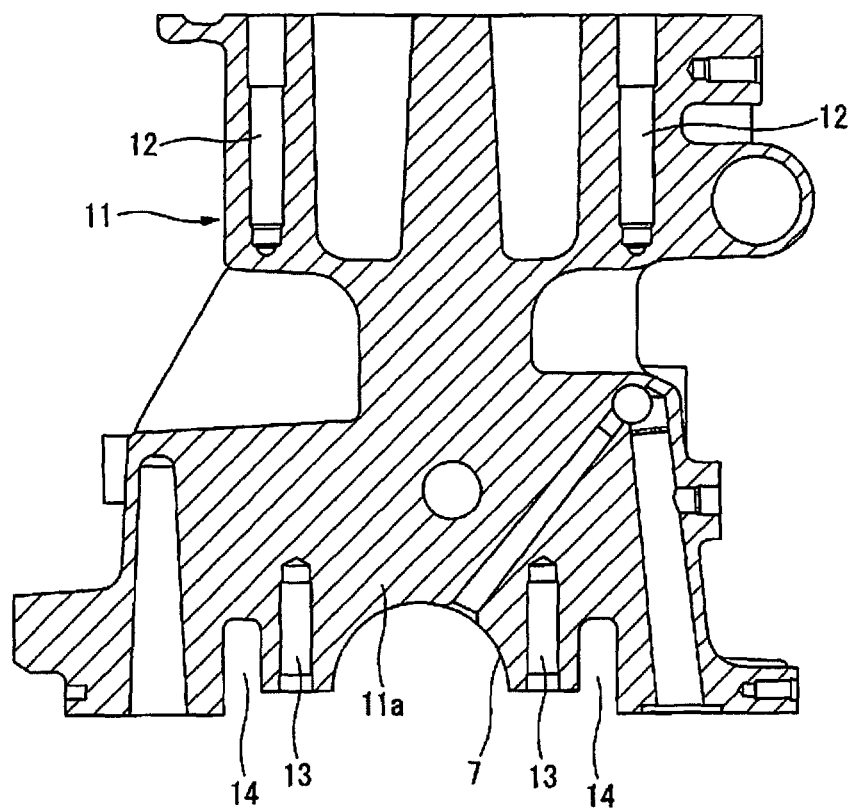
FIG. 7 is a cross-sectional view of a cylinder block along the No. 3 main bearing unit.

In addition, in the present embodiment, also with respect to the cylinder block side bearing part 7 that forms a part of the upper half of the main bearing unit 6, the No. 3 main bearing unit 6 in the center has a slightly different configuration than the other No. 1 No. 2, No. 4, and No. 5 main bearing units 6. Specifically, FIG. 7 illustrates a cross section of the cylinder block 11 along the No. 3 main bearing unit 6, and the axial length of the cylinder head bolt hole 12 that is provided along this cross section is configured to be longer compared to the cylinder head bolt holes in the other positions. In other words, the length of the cylinder head bolts (not shown) that are disposed along the No. 3 main bearing unit 6 are longer than the cylinder head bolts in the other positions, so that the bolt axial force is transmitted to a lower position. Additionally, a No. 3 cylinder block side bearing part 7 is formed in the bulkhead 11 a between the No. 2 cylinder and the No. 3 cylinder, and a pair of notched portions 14 are formed from the lower surface side, along the two sides of bolt holes—13 in which are inserted bearing cap bolts that are not shown. The cylinder block side bearing part 7 is detached from the side wall of the cylinder block 11 so as to be capable of being more freely displaced by the notched portions 14. Therefore, when the cylinder block 11 and the cylinder head (not shown), both of which are made of an aluminum alloy, are thermally expanded with the rise in the engine temperature, an action is generated in which the cylinder block side bearing part 7 is pulled upwardly by the cylinder head bolts consisting of steel, which has a relatively small thermal expansion. Thus, when the engine temperature is high, the bearing clearance of the No. 3 main bearing unit 6 (in particular the bearing clearance in the upper half) is expanded more compared to the other main bearing units 6. In the present invention, the above-described configuration of the No. 3 cylinder block side bearing part 7 is not necessarily indispensable; the configuration may be such that only the bearing cap 8 side is varied in the No. 3 main bearing unit 6.

Figure 8A:
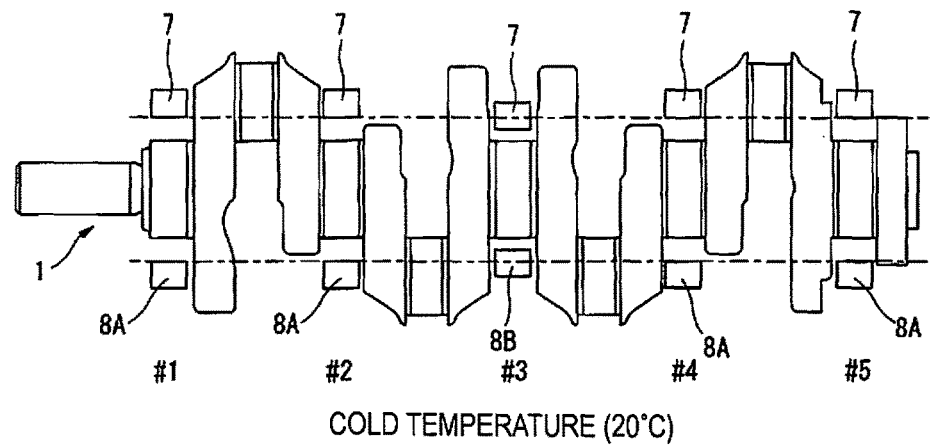
FIG. 8A is an explanatory view illustrating the bearing clearance at the time of a cold state of the engine.
Figure 8B:
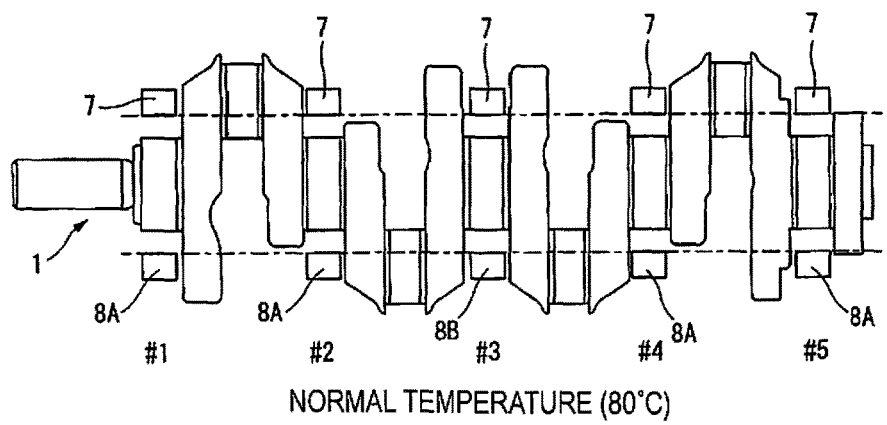
FIG. 8B is an explanatory view illustrating the bearing clearance at the time of normal engine temperature.
Figure 8C:
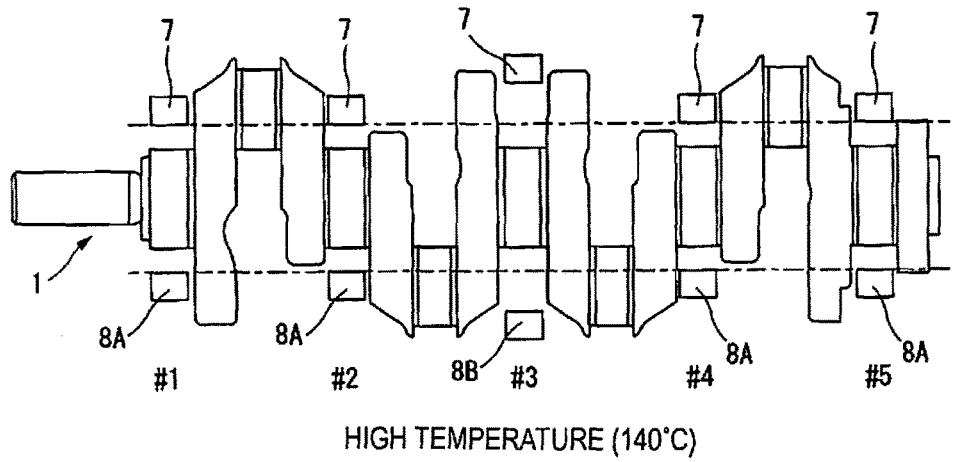
FIG. 8C is an explanatory view illustrating the bearing clearance at the time of a high engine temperature.

FIGS. 8A to 8C are explanatory views illustrating a preferred setting of the bearing clearances when employing the configuration as described above. Here, the bearing clearances are illustrated schematically enlarged. During a prescribed normal engine temperature (for example 20° C.), that is, when the engine is cold, the bearing clearance of the No. 3 main bearing unit 6 is slightly smaller than the bearing clearances of the other, No. 1, No. 2, No. 4, and No. 5 main bearing units 6, as illustrated in FIG. 8A. The difference in the bearing clearance between the two becomes smaller as the engine temperature (more specifically, the temperature around the main bearing units 6) rises, and when reaching a temperature of a normal range of an internal combustion engine after warm-up (for example 80° C.), the bearing clearance of the No. 3 main bearing unit 6 becomes equal to the bearing clearances of the other, No. 1, No. 2, No. 4, and No. 5 main bearing units 6, as illustrated in FIG. 8B. That is, in a temperature range of 50° C. to 100° C., which is frequently used after warm-up, the bearing clearances of all of the main bearing units 6 are substantially equal. Therefore, the generation of striking sound caused by excessive bearing clearance can be avoided.

Then, when the engine temperature reaches a high engine temperature range that becomes a problem from the point of view of bearing durability (greater than or equal to 100° C., for example 140° C.), the bearing clearance of the No. 3 main bearing unit 6 becomes larger than the bearing clearances of the others, No. 1, No. 2, No. 4 and No. 5 main bearing units 6, as illustrated in FIG. 8C.

In an in-line four-cylinder internal combustion engine whereby the pistons of the mutually adjacent No. 2 cylinder and No. 3 cylinder move in phase, the crankshaft 1 is rotated while being warped into an arcuate shape by the inertia load of the pistons, etc., in the same manner as the above-described first embodiment. As a result, the displacement of the No. 3 journal portion 2 between the No. 2 and No. 3 cylinders becomes larger than the other four journal portions 2; however, when the temperature is high, since the bearing clearance of the No. 3 main bearing unit in the center becomes larger than the bearing clearances of the other main bearing units 6, as described above, the bearing load that is generated in the No. 3 main bearing unit 6 is reduced. Therefore, even in a situation where the surroundings of the main bearing unit 6 is at a high temperature and where the engine is being rotated at a high speed, the bearing load in each main bearing unit 6 becomes substantially uniform, and a premature deterioration of only the No. 3 main bearing unit 6 is suppressed.

In order to suppress the arcuate warping of the crankshaft 1 described above, providing a relatively large counterweight 5 to all eight of the crank webs 4 is effective; however, providing a large number of such large counterweights 5 is accompanied by an increase in the weight of the crankshaft 1 and an increase in the weight of the internal combustion engine as a whole, which is not preferable. According to the present invention, it is possible to achieve uniformity in the bearing load of each main bearing unit 6 without increasing the weight of the crankshaft 1.

In the above-described embodiment, since a bearing cap 8B made of aluminum alloy with a relatively low rigidity is used as the bearing cap 8 of the No. 3 main bearing unit 6, there is also the benefit that a phenomenon in which the edges of both axial ends are put in a locally strong contact with the journal portion 2 is less likely to occur.

In addition to suppressing the bearing load of the No. 3 main bearing unit 6 by expanding the bearing clearance as described above, further reducing the supporting rigidity of the No. 3 main bearing unit 6 (more specifically, the No. 3 bearing cap 8A) to be lower than the other main bearing units 6 is also effective. For example, the thickness of the No. 3 bearing cap 8A may be reduced to lower the rigidity. Alternatively, it is possible to relatively reduce the support rigidity of the No. 3 bearing cap 8A, by employing a configuration in which the No. 1 and No. 2 bearing caps 8 and the No. 4 and No. 5 bearing caps 8 are connected front and back by a beam structure or a ladder structure, while the No. 3 bearing cap 8A is independent.

One embodiment of the present invention was described above, but the present invention is not limited to the above-described embodiment, and various modifications are possible. For example, the present invention can be applied to various internal combustion engines, not limited to the in-line, two-cylinder internal combustion engine and the in-line, four-cylinder internal combustion engine described above.

The invention claimed is:

1. A crankshaft bearing structure of an internal combustion engine for a multi-cylinder internal combustion engine having two cylinders adjacent to each other in which each piston moves in phase, and the crankshaft bearing structure comprising:
    a main bearing unit at each end portion of a crankshaft; and
    an intermediate main bearing unit at an inter-cylinder position of the crankshaft,
    the intermediate main bearing unit being configured to have a first bearing clearance that is substantially equal to bearing clearances in the main bearing units at a prescribed normal engine temperature of the internal combustion engine, and
    the intermediate main bearing unit being configured to have a second bearing clearance that is larger than bearing clearances in the main bearing units as engine temperature becomes higher than the prescribed normal engine temperature of the internal combustion engine.

2. The crankshaft bearing structure according to claim 1, wherein
    the internal combustion engine is a two-cylinder internal combustion engine comprising the main bearing units and the intermediate main bearing unit, and the bearing clearance of the intermediate main bearing unit in a center is larger than the bearing clearances in the main bearing units at a time of high engine temperature, which is higher than the prescribed normal engine temperature of the internal combustion engine.

3. The crankshaft bearing structure according to claim 1, wherein
    the internal combustion engine is a four-cylinder internal combustion engine comprising the main bearing units and three of the intermediate bearing units, and the bearing clearance of the intermediate main bearing unit that corresponds a No. 3 main bearing unit in a center of three of the intermediate main bearing units is larger than the bearing clearances in the main bearing units and the other two of the intermediate main bearing units at a time of high engine temperature, which is higher than the prescribed normal engine temperature of the internal combustion engine.

4. The crankshaft bearing structure according to claim 1, wherein
the intermediate main bearing unit includes a bearing cap having a thermal expansion coefficient that is greater than a thermal expansion coefficient of bearing caps in the main bearing units.

5. The crankshaft bearing structure according to claim 4, wherein
the internal combustion engine is a two-cylinder internal combustion engine comprising the main bearing units and the intermediate main bearing unit, and the bearing clearance of the intermediate main bearing unit in a center is larger than the bearing clearances in the main bearing units at a time of high engine temperature, which is higher than the prescribed normal engine temperature of the internal combustion engine.

6. The crankshaft bearing structure according to claim 4, wherein
the internal combustion engine is a four-cylinder internal combustion engine comprising the main bearing units and three of the intermediate main bearing units, and the bearing clearance of the intermediate main bearing unit that corresponds a No. 3 main bearing unit in a center of three of the intermediate main bearing units is larger than the bearing clearances in the main bearing units and the other two of the intermediate main bearing units at a time of high engine temperature, which is higher than the prescribed normal engine temperature of the internal combustion engine.

7. The crankshaft bearing structure according to claim 4, wherein
the bearing cap of the intermediate main bearing unit is made of an aluminum alloy, and the bearing caps of the main bearing units are primarily made from iron.

8. The crankshaft bearing structure according to claim 7, wherein
the internal combustion engine is a two-cylinder internal combustion engine comprising the main bearing units and the intermediate main bearing unit, and the bearing clearance of the intermediate main bearing unit in a center is larger than the bearing clearances in the main bearing units at a time of high engine temperature, which is higher than the prescribed normal engine temperature of the internal combustion engine.

9. The crankshaft bearing structure according to claim 7, wherein
the internal combustion engine is a four-cylinder internal combustion engine comprising the main bearing units and three of the intermediate main bearing units, and the bearing clearance of the intermediate main bearing unit that corresponds a No. 3 main bearing unit in a center of three of the intermediate main bearing units is larger than the bearing clearances in the main bearing units and the other two of the intermediate main bearing units at a time of high engine temperature, which is higher than the prescribed normal engine temperature of the internal combustion engine.

* * * * *